(12) United States Patent
Thakkar et al.

(10) Patent No.: US 10,694,570 B2
(45) Date of Patent: Jun. 23, 2020

(54) LTE-WIFI AGGREGATION (LWA) SUPPORT IN A CLOUD-RAN SYSTEM

(71) Applicant: CommScope Technologies LLC, Hickory, NC (US)

(72) Inventors: Sohil Thakkar, North Andove, MA (US); Michael McFarland, Newton, MA (US); Vedat Eyuboglu, Weston, MA (US); Balaji B Raghothaman, Chester Springs, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/839,669

(22) Filed: Dec. 12, 2017

(65) Prior Publication Data

US 2018/0167993 A1     Jun. 14, 2018

Related U.S. Application Data

(60) Provisional application No. 62/433,001, filed on Dec. 12, 2016.

(51) Int. Cl.
*H04W 76/16* (2018.01)
*H04W 84/12* (2009.01)
(Continued)

(52) U.S. Cl.
CPC .......... *H04W 76/16* (2018.02); *H04B 1/7075* (2013.01); *H04W 48/16* (2013.01);
(Continued)

(58) Field of Classification Search
None
See application file for complete search history.

(56) References Cited

U.S. PATENT DOCUMENTS 7,933,619 B2   4/2011  Kim
7,983,672 B2   7/2011  Humblet et al.
(Continued)

FOREIGN PATENT DOCUMENTS

EP        3269118 A2    1/2018
KR   1020160030035 A    3/2016
(Continued)

OTHER PUBLICATIONS

Burbidge, "Liaison from 3GPP on LWA and LWIP", "doc.: IEEE 802.11-16/351r0", Dated Mar. 14, 2016, Retrieved on Apr. 24, 2018, pp. 1-25: Publisher: IEEE.
(Continued)

*Primary Examiner* — Hong S Cho
(74) *Attorney, Agent, or Firm* — Fogg & Powers LLC (57) ABSTRACT

One embodiment is directed to a system to provide wireless service to user equipment using licensed radio frequency spectrum and unlicensed RF spectrum. The system comprises a controller and a plurality of radio points to transmit and receive radio frequency signals to and from the user equipment using the licensed RF spectrum. The system further comprises a wireless termination to transmit and receive radio frequency signals to and from the user equipment using unlicensed RF spectrum. The controller is configured to use a mobility group for providing the wireless service to the user equipment using the unlicensed RF spectrum and a plurality of WLAN access points. The controller is configured to establish an interface with the wireless termination for the mobility group to communicate control plane data to the wireless termination associated with providing the wireless service to the user equipment using the unlicensed RF spectrum. Other embodiments are disclosed.

30 Claims, 6 Drawing Sheets

(51) Int. Cl.
    *H04W 16/24*     (2009.01)
    *H04W 16/14*     (2009.01)
    *H04W 48/16*     (2009.01)
    *H04B 1/7075*    (2011.01)
    *H04W 74/00*     (2009.01)
    *H04W 92/12*     (2009.01)

(52) U.S. Cl.
    CPC ............ *H04W 84/12* (2013.01); *H04W 16/14* (2013.01); *H04W 74/002* (2013.01); *H04W 92/12* (2013.01)

(56) References Cited

U.S. PATENT DOCUMENTS

| | | | |
|---|---|---|---|
| 8,160,629 | B2 | 4/2012 | Mate et al. |
| 8,170,598 | B2 | 5/2012 | Raghothaman et al. |
| 8,229,397 | B2 | 7/2012 | Hou et al. |
| 8,340,636 | B2 | 12/2012 | Yin et al. |
| 8,503,342 | B2 | 8/2013 | Richardson |
| 8,688,809 | B2 | 4/2014 | Ch'ng et al. |
| 8,774,134 | B2 | 7/2014 | Raghothaman et al. |
| 8,873,512 | B2 | 10/2014 | Richardson et al. |
| 9,078,284 | B2 | 7/2015 | Richardson |
| 9,166,799 | B2 | 10/2015 | Kim |
| 9,210,569 | B2 | 12/2015 | Chiussi et al. |
| 9,876,670 | B2 | 1/2018 | Richardson et al. |
| 9,998,310 | B2 | 6/2018 | Barbieri et al. |
| 10,097,391 | B2 | 10/2018 | Fertonani et al. |
| 10,355,895 | B2 | 7/2019 | Barbieri et al. |
| 2014/0293970 | A1 | 10/2014 | Damnjanovic et al. |
| 2015/0049715 | A1 | 2/2015 | Yerramalli et al. |
| 2016/0037550 | A1 | 2/2016 | Barabell et al. |
| 2016/0234726 | A1* | 8/2016 | Nuggehalli ....... H04W 36/0022 |
| 2016/0338068 | A1 | 11/2016 | Cheng et al. |
| 2017/0041859 | A1* | 2/2017 | Martin .................. H04W 48/16 |
| 2017/0094681 | A1 | 3/2017 | Takeda et al. |
| 2017/0099625 | A1* | 4/2017 | Li ......................... H04W 28/08 |
| 2017/0118133 | A1* | 4/2017 | Meylan ................ H04L 47/624 |
| 2017/0339721 | A1 | 11/2017 | Mukherjee et al. |
| 2017/0373890 | A1 | 12/2017 | Fertonani et al. |
| 2018/0199394 | A1* | 7/2018 | Teyeb .................. H04W 76/16 |
| 2018/0287696 | A1 | 10/2018 | Barbieri et al. |
| 2019/0007246 | A1 | 1/2019 | Fertonani et al. |
| 2019/0116568 | A1 | 4/2019 | Fertonani et al. |

FOREIGN PATENT DOCUMENTS

| | | |
|---|---|---|
| WO | 2016153306 A1 | 9/2016 |
| WO | 2016176481 A1 | 11/2016 |
| WO | 2016145371 A3 | 12/2016 |
| WO | 2016190902 A1 | 12/2016 |
| WO | 2017010764 A1 | 1/2017 |
| WO | 2017070635 A1 | 4/2017 |
| WO | 2017105306 A1 | 6/2017 |
| WO | 2018017468 A1 | 1/2018 |

OTHER PUBLICATIONS

International Searching Authority, "International Search Report and Written Opinion for PCT App. No. PCT/US2017/065895", "Foreign Counterpart to U.S. Appl. No. 15/839,669", dated Mar. 26, 2018, pp. 1-17, Published in: WO.

"Discussion of hidden node problem of LAA", 3GPP TSG RAN WG1 Meeting #80, Feb. 2015, pp. 1-4, Athens, Greece.

AT&T, "At&T Reached Wireless Speeds of More than 750 Mbps with LTE Licensed Assisted Access (LTE-LAA) Field Trials", Jun. 26, 2017, pp. 1-5, San Francisco, CA.

FCC, "Revision of Parts 2 and 15 of the Commission's Rules to Permit Unlicensed National Information Infrastructure (U-NII) devices in the 5GHz band", Federal Communications Commission, FCC 03-287; Nov. 18, 2003.

Fullmer et al., "Solutions to Hidden Terminal Problems in Wireless Networks", Computer Engineering Department University of California, Aug. 1997, pp. 1-11, Santa Cruz, CA.

ITU-R, "Guidelines for evaluation of radio interface technologies for IMT-Advanced", M Series Mobile, radiodetermination, amateur and related satellites services, Dec. 2009, pp. 1-72, International Telecommunication Union.

Kudo et al., "User Equipment Centric Downlink Access in Unlicensed Spectrum for Heterogeneous Mobile Network", IEICE Transactions on Communications, Oct. 2015, pp. 1969-1977, The Institute of Electronics, Information and Communication Engineers.

Lee et al., "Performance Analysis of License Assisted Access LTE with Asymmetric Hidden Terminals", Dec. 13, 2016, pp. 1-14.

Li et al., "Modeling and Analyzing the Coexistence of Wi-Fi and LTE in Unlicensed Spectrum", IEEE Transactions on Wireless Communications, Oct. 2015, pp. 1-32, IEEE.

Qualcomm, "Qualcomm Research LTE in Unlicensed Spectrum: Harmonious Coexistence with Wi-Fi", Jun. 2014, pp. 1-19, Qualcomm Technologies, Inc.

Sagari et al., "Coordinated Dynamic Spectrum Management of LTE-U and Wi-Fi Networks", IEEE International Symposium on Dynamic Spectrum Access Networks (DySPAN), 2015, pp. 209-220, IEEE.

T-Mobile Newsroom, "Samsung Galaxy S8 Will be Twice as Fast in Hundreds of Cities on T-Mobile's Advanced LTE Network", Mar. 28, 2017, pp. 1-16, T-Mobile.

T-Mobile Newsroom, "T-Mobile Completes Nation's First Live Commercial Network Test of License Assisted Access (LAA)", Jun. 25, 2017, pp. 1-4, T-Mobile.

Interdigital, "Cellular-Wi-Fi Integration A comprehensive analysis of the technology and standardization roadmap", Jun. 2012; pp. 1-26.

International Searching Authority, "International Search Report and Written Opinion from PCT Application No. PCT/US2019/016159 dated May 17, 2019", from Foreign Counterpart to U.S. Appl. No. 16/264,388, pp. 1-13, Published: WO.

Paolini et al., "LTE unlicensed and Wi-Fi: Moving beyond coexistence", Published Dec. 24, 2015 by Senza Fili Consulting. Retrieved from http://noc.ucsc.edu/docs/Wi-Fi/LTEU-LTELAA-2015.pdf; pp. 1-85.

European Patent Office, "Extended European Search Report from EP Application No. 17882089.0", from Foreign Counterpart to U.S. Appl. No. 15/839,669, dated Apr. 3, 2020, pp. 1 through 10, Published: EP.

Sirotkin et al., "LTE-WLAN Aggregation (LWA): Benefits and Deployment Considerations", White Paper, Apr. 1, 2016, pp. 1 through 22, Intel.

* cited by examiner

LTE-WIFI AGGREGATION (LWA) SUPPORT IN A CLOUD-RAN SYSTEM

CROSS-REFERENCE TO RELATED APPLICATIONS

This application claims the benefit of U.S. Provisional Patent Application Ser. No. 62/433,001, titled "LTE-WIFI Aggregation (LWA) Support In A Cloud-RAN System" and filed on Dec. 12, 2016, which is hereby incorporated herein by reference.

BACKGROUND

One approach to using unlicensed radio frequency (RF) spectrum to deliver Long-Term Evolution (LTE) wireless service is referred to as "LTE and Wi-Fi Link Aggregation" or just "LWA." LWA has been proposed as an alternative to other schemes for using unlicensed RF spectrum to provide LTE wireless service, such as Long Term Evolution Unlicensed (LTE-U) and Licensed Assisted Access LTE (LAA).

With LWA, an LTE base station (also referred to as an "eNodeB") communicates user data that is intended for a given item of user equipment (UE) to the wireless local area network (WLAN) infrastructure. The WLAN infrastructure in turn wirelessly transmits the user data to the UE using unlicensed RF spectrum and the relevant WLAN (IEEE 802.11) protocols. The LTE eNodeB also transmits user data to the UE using licensed RF spectrum. That is, both a licensed LTE link and an unlicensed WLAN link are used together (that is, are "aggregated") to wirelessly transmit downstream user data to the UE. With LWA, signaling is communicated between the LTE eNodeB and the UE using the licensed LTE link. Since the LTE user data is transmitted by the WLAN infrastructure using WLAN protocols, the LTE user data acts like any other WLAN traffic when transmitted using LWA.

In LWA, a special interface, the "Xw" interface, is used to communicate control and user data between an eNodeB (the "anchor") and the WLAN infrastructure. The logical node that, from the perspective of an LTE eNodeB, terminates the Xw interface is referred to as the "wireless termination" (WT). The WT can be implemented using a single WiFi access point (AP) or with a WLAN access controller (AC) that communicates with a group of WLAN APs.

LWA is often used in deployments where a group of small cell base stations are used to provide LTE service in a particular coverage area (for example, in "in-building" applications).

Figure 1:
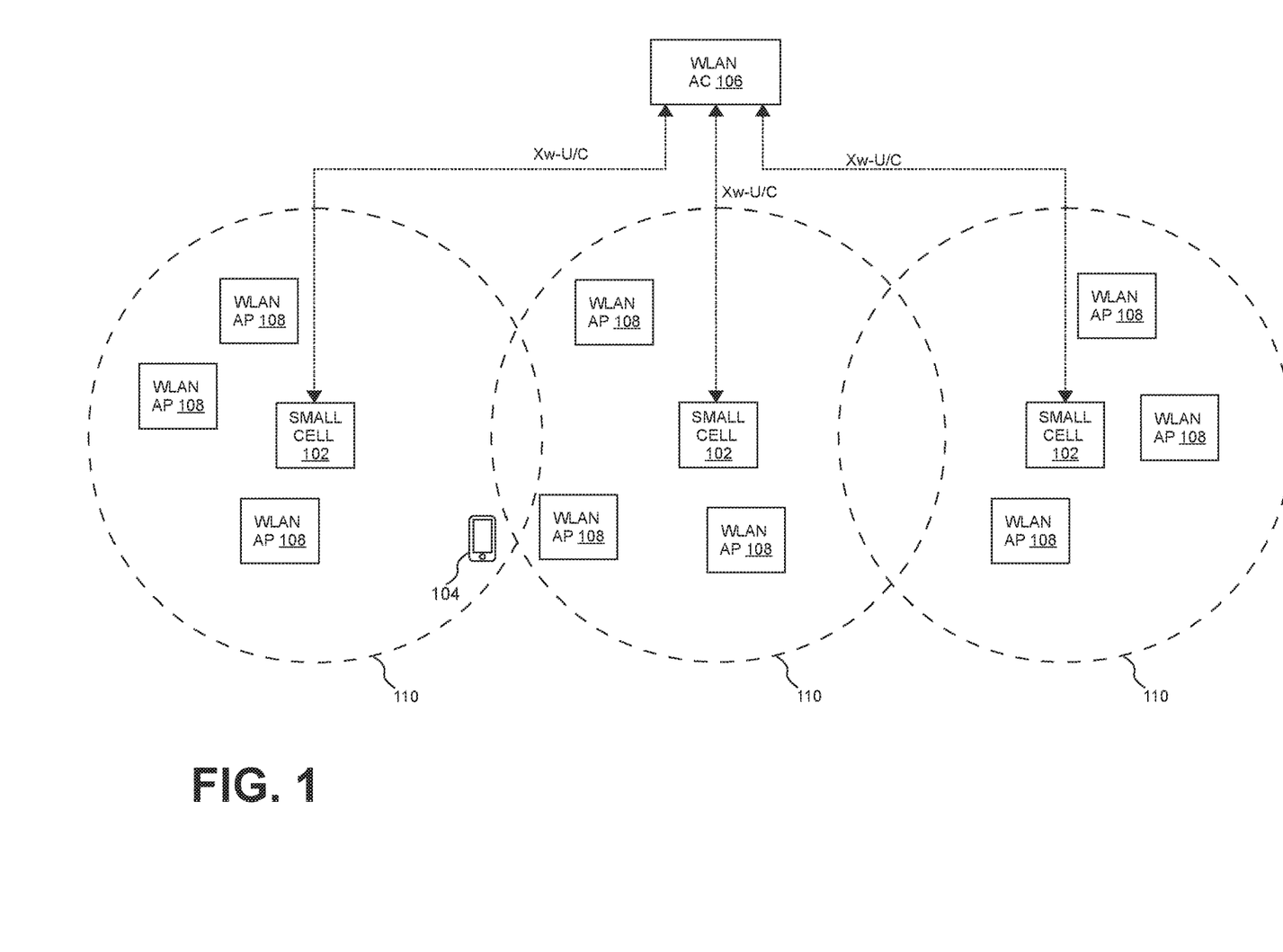
FIG. 1 is a block diagram illustrating one non-collocated example of an LWA small cell deployment.

FIG. 1 is a block diagram illustrating one non-collocated example of an LWA small cell deployment. In this example, multiple small cells 102 are deployed throughout a coverage area. Each small cell 102 is coupled to the wireless operator's core network via an Internet Protocol (IP) network (for example, via an IP connection implemented using an Ethernet local area network (LAN) and an Internet connection).

Each small cell 102 is configured to use LWA to communicate with user equipment (UE) 104. Each small cell 102 communicates with a wireless termination (WT) using the LWA Xw interface. In the example shown in FIG. 1, the WT is implemented using a WLAN AC 106 that communicates with a group of WLAN APs 108 that are distributed throughout the coverage area. The WLAN AC 106 is communicatively coupled to the WLAN APs 108 and the small cells 102 via, for example, an IP network (for example, the Ethernet LAN to which the small cells 102 are otherwise connected). This is typical in in-building small cell deployments. Each small cell 102 has an associated LWA mobility group 110.

In this example, the WT is not co-located with small cells 102.

Figure 2:
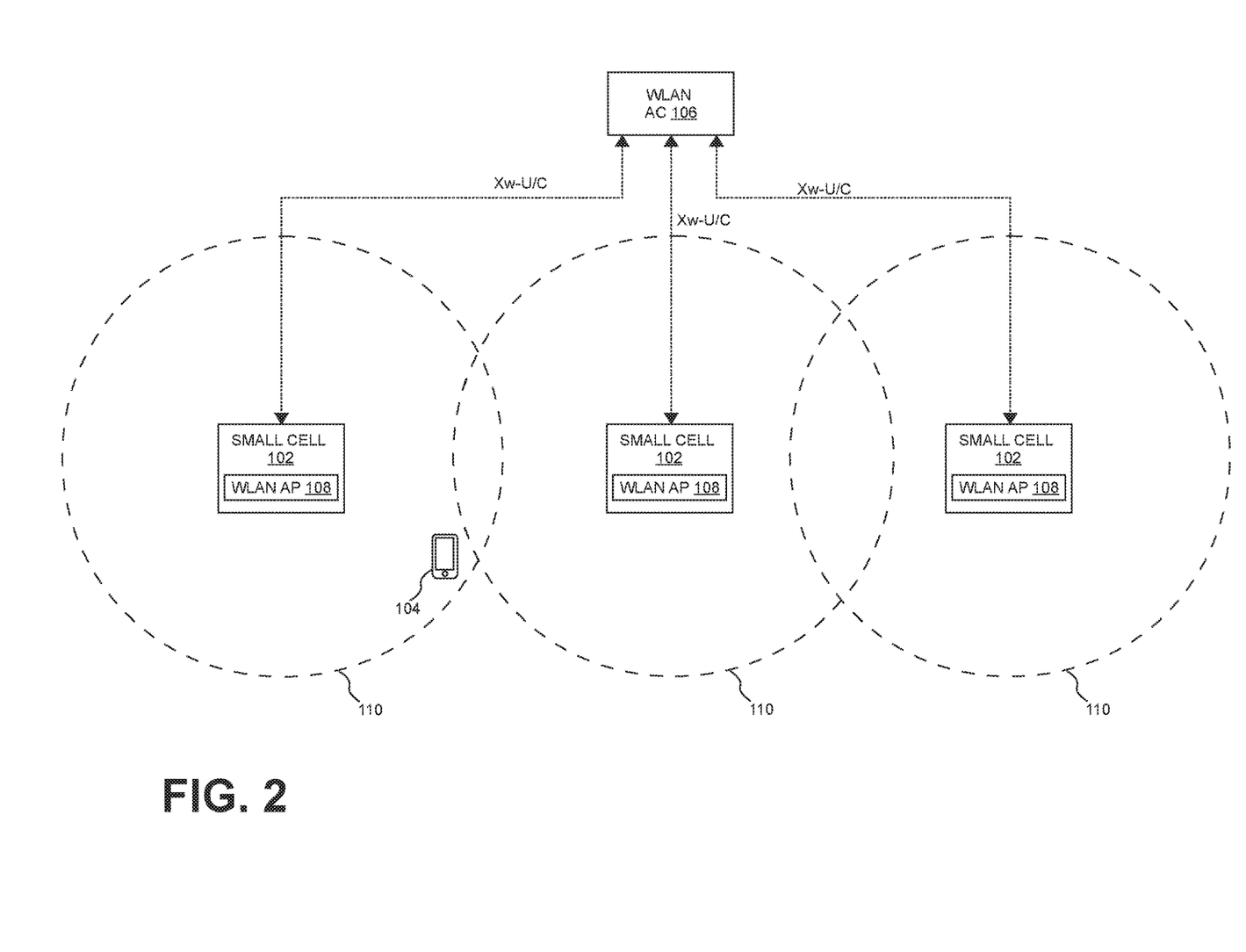
FIG. 2 is a block diagram illustrating a collocated example of an LWA small cell deployment.

FIG. 2 is a block diagram illustrating a collocated example of an LWA small cell deployment. In this example, each small cell 202 is integrated with a WLAN AP 208. Otherwise, the example shown in FIG. 2 is similar to the one shown in FIG. 1.

With such small-cell-LWA deployments, a separate Xw interface and LWA mobility group is implemented for each small cell. As a result, in large deployments with many small cells, a large number of Xw interfaces and LWA mobility groups will need to be implemented and managed. Also, as a UE moves throughout the coverage area, it will pass through many LWA mobility groups. The overhead associated with tracking each UE and determining the appropriate LWA mobility group increases as the number of small cells increases. Moreover, gaps in LWA coverage can result due to differences in the hand-over boundaries of the unlicensed-spectrum coverage areas of the APs and the hand-over boundaries of the licensed-spectrum coverage areas of the small cells.

Furthermore, where a centralized WLAN AC is used, the user traffic for each Xw interface is often communicated from the respective small cell, to the WLAN AC, and then to the appropriate WLAN AP. This can result in the "hair-pinning" of the user traffic as it flows from a remotely located small cell, to the centrally located WLAN AC, and then back to the remotely located WLAN AP.

SUMMARY

One embodiment is directed to a system to provide wireless service to user equipment using licensed radio frequency (RF) spectrum and unlicensed RF spectrum. The system comprises a controller communicatively coupled to a core network of a wireless service provider and a plurality of radio points to transmit and receive radio frequency signals to and from the user equipment using the licensed RF spectrum. Each of the radio points associated with at least one antenna and located remote from the controller. The plurality of radio points is communicatively coupled to the controller over a switched Ethernet network. The system further comprises a wireless termination to transmit and receive radio frequency signals to and from the user equipment using unlicensed RF spectrum. The wireless termination comprises a plurality of wireless local area network (WLAN) access points. The controller is configured to use a mobility group for providing the wireless service to the user equipment using the unlicensed RF spectrum and the plurality of WLAN access points. The controller is configured to establish an interface with the wireless termination for the mobility group to communicate control plane data to the wireless termination associated with providing the wireless service to the user equipment using the unlicensed RF spectrum.

Another embodiment is directed to a system to provide wireless service to user equipment using licensed radio frequency (RF) spectrum and unlicensed RF spectrum. The system comprises a controller communicatively coupled to an LTE core network of a wireless service provider that provides the wireless service and a plurality of radio points to transmit and receive radio frequency signals to and from the user equipment using an LTE air interface and licensed RF spectrum. Each of the radio points associated with at least one antenna and located remote from the controller.

The plurality of radio points is communicatively coupled to the controller over a switched ETHERNET network. The system further comprises a wireless local area network (WLAN) access controller and a plurality of WLAN access points to transmit and receive radio frequency signals to and from the user equipment using unlicensed RF spectrum. The WLAN access points communicatively coupled to the WLAN access controller. The controller is configured to use a LWA mobility group for providing the wireless service to the user equipment using the unlicensed RF spectrum and the plurality of WLAN access points. The controller is configured to establish an LWA Xw interface with the WLAN access controller for the LWA mobility group to communicate Xw-C control plane data and Xw-U user plane data associated with providing the wireless service to the user equipment using the unlicensed RF spectrum.

Another embodiment is directed to a system to provide wireless service to user equipment using licensed radio frequency (RF) spectrum and unlicensed RF spectrum. The system comprises a controller communicatively coupled to an LTE core network of a wireless service provider that provides the wireless service and a plurality of radio points to transmit and receive radio frequency signals to and from the user equipment using an LTE air interface and licensed RF spectrum. Each of the radio points associated with at least one antenna and located remote from the controller. The plurality of radio points is communicatively coupled to the controller over a switched ETHERNET network. The system further comprises a wireless local area network (WLAN) access controller and a plurality of WLAN access points to transmit and receive radio frequency signals to and from the user equipment using unlicensed RF spectrum. The WLAN access points communicatively coupled to the WLAN access controller. The controller is configured to use a LWA mobility group for providing the wireless service to the user equipment using the unlicensed RF spectrum and the plurality of WLAN access points. The controller is configured to establish an LWA Xw-C interface with the WLAN access controller for the LWA mobility group to communicate Xw-C control plane data associated with providing the wireless service to the user equipment using the unlicensed RF spectrum. The controller is configured to establish a respective LWA Xw-U interface with each WLAN access point for the LWA mobility group to communicate Xw-U user plane data associated with providing the wireless service to the user equipment using the unlicensed RF spectrum.

Another embodiment is directed to a system to provide wireless service to user equipment using licensed radio frequency (RF) spectrum and unlicensed RF spectrum. The system comprises a controller communicatively coupled to a core network of a wireless service provider and a plurality of radio points to transmit and receive radio frequency signals to and from the user equipment using the licensed RF spectrum. Each of the radio points associated with at least one antenna and located remote from the controller. The plurality of radio points is communicatively coupled to the controller over a switched Ethernet network. The system further comprises a security gateway and wireless local area network (WLAN) infrastructure to transmit and receive radio frequency signals to and from the user equipment using unlicensed RF spectrum. The WLAN infrastructure comprises a plurality of WLAN access points. The controller is configured to use a mobility group for providing the wireless service to the user equipment using the unlicensed RF spectrum and the plurality of WLAN access points. The controller is configured to communicate with the user equipment using Internet Protocol Security (IPSec) tunnels established via the security gateway by the user equipment.

Other embodiments are disclosed.

The details of various embodiments are set forth in the accompanying drawings and the description below. Other features and advantages will become apparent from the description, the drawings, and the claims.

DETAILED DESCRIPTION

Figure 3:
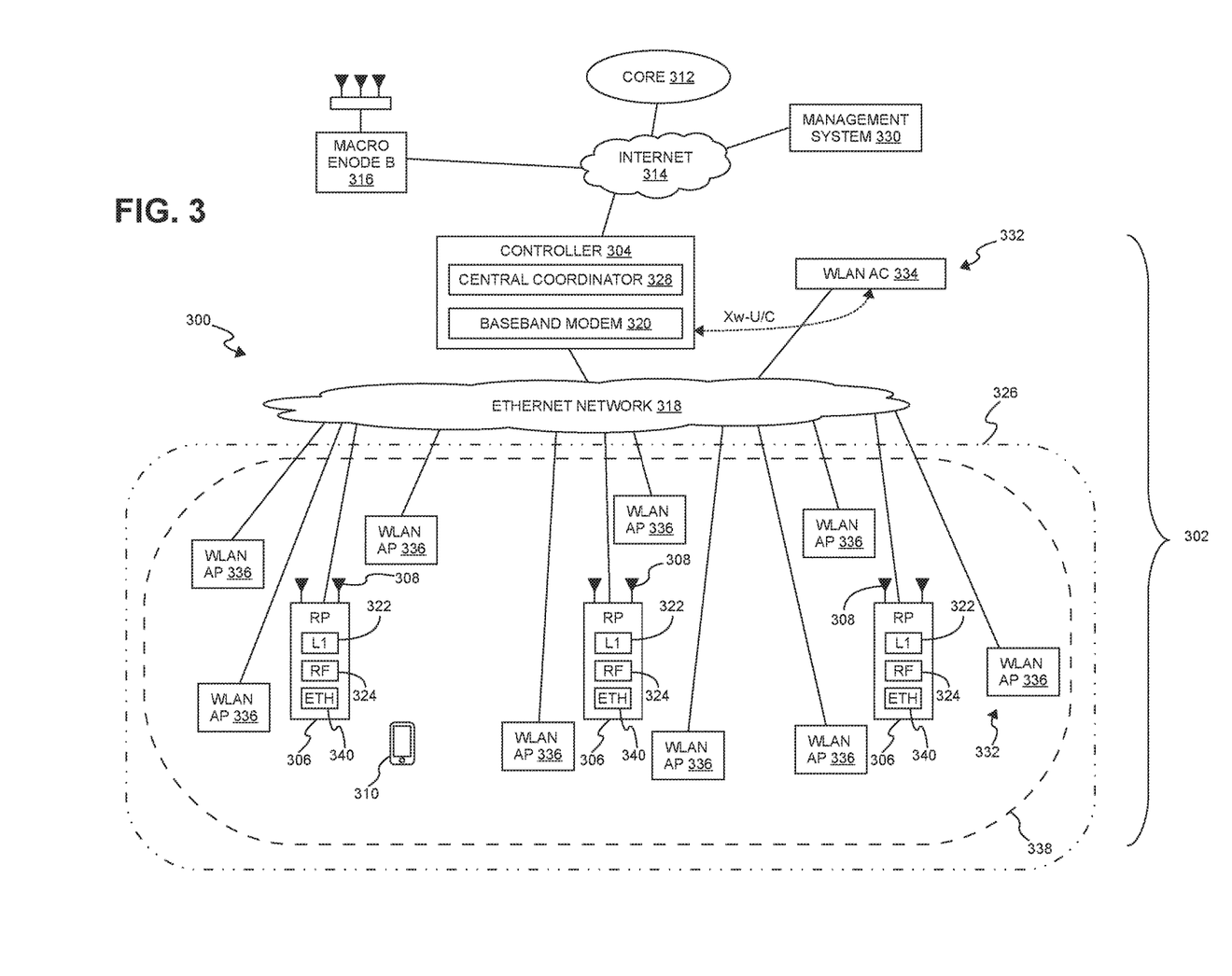
FIG. 3 is a block diagram illustrating one exemplary embodiment of a radio access network with support for WiFi link aggregation.

FIG. 3 is a block diagram illustrating one exemplary embodiment of a radio access network (RAN) 300 with support for WiFi link aggregation. The RA 300 is deployed at a site 302 to provide wireless coverage and capacity for one or more wireless network operators. The site 302 may be, for example, a building or campus or other grouping of buildings (used, for example, by one or more businesses, government entities, or other enterprises) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 3, the RAN 300 at the site 302 is implemented at least in part using a distributed base station architecture that employs at least one central controller 304 and multiple radio points (RPs) 306. Each RP 306 includes or is coupled to one or more antennas 308 via which downstream RF signals are radiated to user equipment 310 and via which upstream RF signals transmitted by user equipment (UE) 310 are received.

The RAN 300 is coupled to the core network 312 of each wireless network operator over an appropriate back-haul. In the exemplary embodiment shown in FIG. 3, the Internet 314 is used for back-haul between the RAN 300 and each core network 312. However, it is to be understood that the back-haul can be implemented in other ways.

The exemplary embodiment of the RAN 300 shown in FIG. 3 is described here as being implemented as a Long Term Evolution (LTE) radio access network providing wireless service using an LTE air interface. LTE is a standard developed by 3GPP standards organization. In this embodiment, the controller 304 and RPs 306 together are used to implement an LTE Evolved Node B (also referred to here as an "eNodeB" or "eNB") that is used to provide user equipment 310 with mobile access to the wireless network operator's core network 312 in order to enable the user equipment 310 to wirelessly communicate data and voice (using, for example, Voice over LTE (VoLTE) technology).

Also, in this exemplary LTE embodiment, each core network 312 is implemented as an Evolved Packet Core (EPC) 312 comprising standard LTE EPC network elements such as, for example, a mobility management entity (MME) and a Serving Gateway (SGW) and, optionally, a Home eNodeB gateway (HeNB GW) and a Security Gateway (SeGW) (all of which are not shown in FIG. 3).

Moreover, in this exemplary embodiment, each controller 304 communicates with the MME and SGW in the EPC core network 312 using the LTE Si interface and communicates with other eNodeBs using the LTE X2 interface. In the example shown in FIG. 3, the controller 304 communicates with an outdoor macro eNodeB 316 via the LTE X2 interface.

The controller 304 and the radio points 306 can be implemented to use an air interface that supports one or more of frequency-division duplexing (FDD) and/or time-division duplexing (TDD). Also, the controller 304 and the radio points 306 can be implemented to use an air interface that supports one or more of the multiple-input-multiple-output (MIMO), single-input-single-output (SISO), single-input-multiple-output (SIMO), and/or multiple-input-single-output (MISO) schemes. Moreover, the controller 304 and/or the radio points 306 can be configured to support multiple air interfaces and/or to support multiple wireless operators.

In the particular exemplary embodiment shown in FIG. 3, the front-haul that communicatively couples each controller 304 to the one or more RPs 306 is implemented using a standard switched ETHERNET network 318. However, it is to be understood that the front-haul between the controllers 304 and RPs 306 can be implemented in other ways.

Generally, one or more nodes in a RAN perform analog radio frequency (RF) functions for the air interface as well as digital Layer 1, Layer 2, and Layer 3 (of the Open Systems Interconnection (OSI) model) functions for the air interface.

In the exemplary embodiment shown in FIG. 3, each controller 304 includes one or more baseband modems (BBMs) (or other units) 320 that perform digital Layer-3, Layer-2, and Layer-1 processing for the LTE air interface, and, as shown in FIG. 2, each RP 106 includes (optionally) one or more Layer-1 units 322 that implements any Layer-1 processing for the air interface that is not performed in the controller 304 and one or more radio frequency (RF) circuits 324 that implement the RF front-end functions for the air interface and the one or more antennas 308 associated with that RP 306.

In one implementation of the RAN 300 shown in FIG. 3, the baseband modems 320 in the controllers 304 perform all of the digital Layer-3, Layer-2, and Layer-1 processing for the air interface, while the RPs 306 (specifically, the RF circuits 324) implement only the RF functions for the air interface and the antennas 308 associated with each RP 306. IQ data representing time-domain symbols for the air interface is communicated between the controller 304 and the RPs 306. Communicating such time-domain IQ data typically requires a relatively high data rate front haul. This approach (communicating time-domain IQ data over the front haul) is suitable for those implementations where the front-haul ETHERNET network 318 is able to deliver the required high data rate.

In some other implementations, the front-haul ETHERNET network 318 is not able to deliver the data rate needed to front haul time-domain IQ data (for example, where the front-haul is implemented using typical enterprise-grade ETHERNET networks). In such implementations, this issue can be addressed by communicating IQ data representing frequency-domain symbols for the air interface between the CUs 304 and the RPs 306. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 318. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

In implementations where frequency-domain IQ data is front-hauled between the controllers 304 and the RPs 306, the baseband modems 320 in each controller 304 perform all of the digital Layer-3, Layer-2, and Layer-1 processing for the air interface except for the inverse fast Fourier transform (IFFT) in the downstream and the fast Fourier transform (FFT) in the upstream. In these implementations, the Layer-1 functions 322 in each RP 306 implement the digital Layer-1 processing for the air interface that is not performed in the controller 304 (that is, the IFFT in the downstream and the FFT in the upstream).

In yet other implementations where the front-haul ETHERNET network 318 is not able to deliver the data rate need to front haul (uncompressed) time-domain IQ data, the time-domain IQ data is compressed prior to being communicated over the ETHERNET network 318, thereby reducing the data rate needed communicate such IQ data over the ETHERNET network 318.

In other implementations, data is front-hauled between the controllers 304 and RPs 306 in other ways (for example, using front-haul interfaces and techniques specified in the Common Public Radio Interface (CPRI) and/or Open Base Station Architecture Initiative (OBSAI) family of specifications).

With traditional base stations (for example, with traditional small cell or distributed base stations), each antenna unit is generally associated with a separate baseband modem and cell, having a separate physical cell identifier associated with that cell and transmitting separate control and reference signals associated with that cell. Traditionally, when several antenna units (for example, in the form of several small cell base stations) are densely deployed within a site (with each antenna unit being served by a separate baseband modem and creating a separate cell), multiple overlapping cells are created with interference at cell borders. This happens even when there is a traditional central service controller that is coordinating multiple small cell base stations. The service controller can assist with network configuration and optimization, handovers, and backhaul aggregation, but does not address the issue that each such antenna unit (with served by a separate baseband modem) forms a separate, standalone cell and interferes with its neighboring separate, standalone cells. The signal quality in these overlap areas can drop significantly, reducing data speeds and impairing voice quality. Also, creating multiple separate cells generates frequent handovers, for example, in the form of "ping-ponging" of stationery users in border areas, or as users move about the site. This further degrades the user experience, and also creates the potential for handover failures.

To address these issues with creating separate cells for each antenna unit, in the exemplary embodiment shown in FIG. 3, each antenna unit (that is, each radio point 306) is associated with a common, single "super" cell 326, sharing a common physical cell identifier across all radio points 306 and for which common control and reference signals are transmitted from all radio points 306. In this embodiment, each controller 304 includes a central coordinator 328 that performs central resource block scheduling for all of the RPs 306 and all of the user equipment 310 associated with those RPs 306. Frequency reuse techniques can be used to create virtual sectors within the single super cell 326, with different RPs 306 serving each of the virtual sectors. The central coordinator 328 can also serve as an aggregation point for data that is transmitted and received to and from multiple RPs 306.

The central coordinator 328 can schedule multiple RPs 306 to jointly transmit to an individual UE 310, helping overcome an interfering macro signal without having to boost RP transmit power such that it would interfere with the macro. Similarly, the central coordinator 328 can schedule multiple RPs 306 to jointly receive uplink transmissions from a single UE 310, which are then combined at the controller 304 (either in the baseband modem 320 or in the central coordinator 328). This inter-RP uplink combining enables the UE 310 to transmit at a lower power, reducing its interference on the macro uplink. Additional details regarding the creation of such a super cell 326 can be found in US Patent Application Serial No. 13/762,283, mentioned above.

The baseband modem 320 and the central coordinator 328 in each controller 304 can be implemented in software or firmware executing on one or more suitable programmable processors. The baseband modem 320 and the central coordinator 328 in each controller 304 (or portions thereof) can be implemented in other ways (for example, in a field programmable gate array (FPGA), application specific integrated circuit (ASIC), etc.). The baseband modem 320 and the central coordinator 328 in each controller 304 can be implemented in other ways.

Likewise, one or more Layer-1 units 322 in each RP 306 can be implemented in software or firmware executing on one or more suitable programmable processors. The one or more Layer-1 units 322 in each RP 306 (or portions thereof) can be implemented in other ways (for example, in a field programmable gate array (FPGA), application specific integrated circuit (ASIC), etc.). The one or more RF circuits 324 in each RP 306 can be implemented using one or more RF integrated circuits (RFICs) and/or discrete components. The Layer-1 units 322 and RF circuit 324 in each RP 306 can be implemented in other ways.

In some implementations, the common, single super cell 326 is created using baseband modems 320 from multiple controllers 304, where resource block scheduling is performed across all of the baseband modems 320 from the multiple controllers 304 (for example, using coordination between the controllers 304 and/or using a separate global coordinator).

The controllers 304 may also include certain MME functionality (not shown) and SGW functionality (not shown), thus allowing traffic to flow directly between UE 310 and a destination node on the Internet 314 or on a local network at the site 302 without traversing an operator's core network 312.

In the exemplary embodiment shown in FIG. 3, a management system 330 is communicatively coupled to the controllers 304 and RPs 306, for example, via the Internet 314 and ETHERNET network 318 (in the case of the RPs 306).

In the exemplary embodiment shown in FIG. 3, the management system 330 communicates with the various elements of the RAN 300 using the Internet 314 and the ETHERNET network 318. Also, in some implementations, the management system 330 sends and receives management communications to and from the controllers 304, each of which in turn forwards relevant management communications to and from the RPs 306.

In this example, each RP 306 comprises an ETHERNET pass-through interface 340 that enables equipment external to the RP 306 to be coupled to the ETHERNET network 318 via that RP 306 using the same connection the RP 306 uses.

The RAN 300 is configured to use both unlicensed and licensed RF spectrum to communicate data with user equipment 310. In the exemplary embodiment shown in FIG. 3, the RAN 300 is configured to use LTE LWA.

Each controller 304 is configured to communicate with the unlicensed RF spectrum wireless local area network (WLAN) infrastructure (that is, a wireless termination (WT) 332) using a single LWA Xw interface that handles both user plane (Xw-U) and control plane (Xw-C) traffic for the Xw interface.

Figure 4:
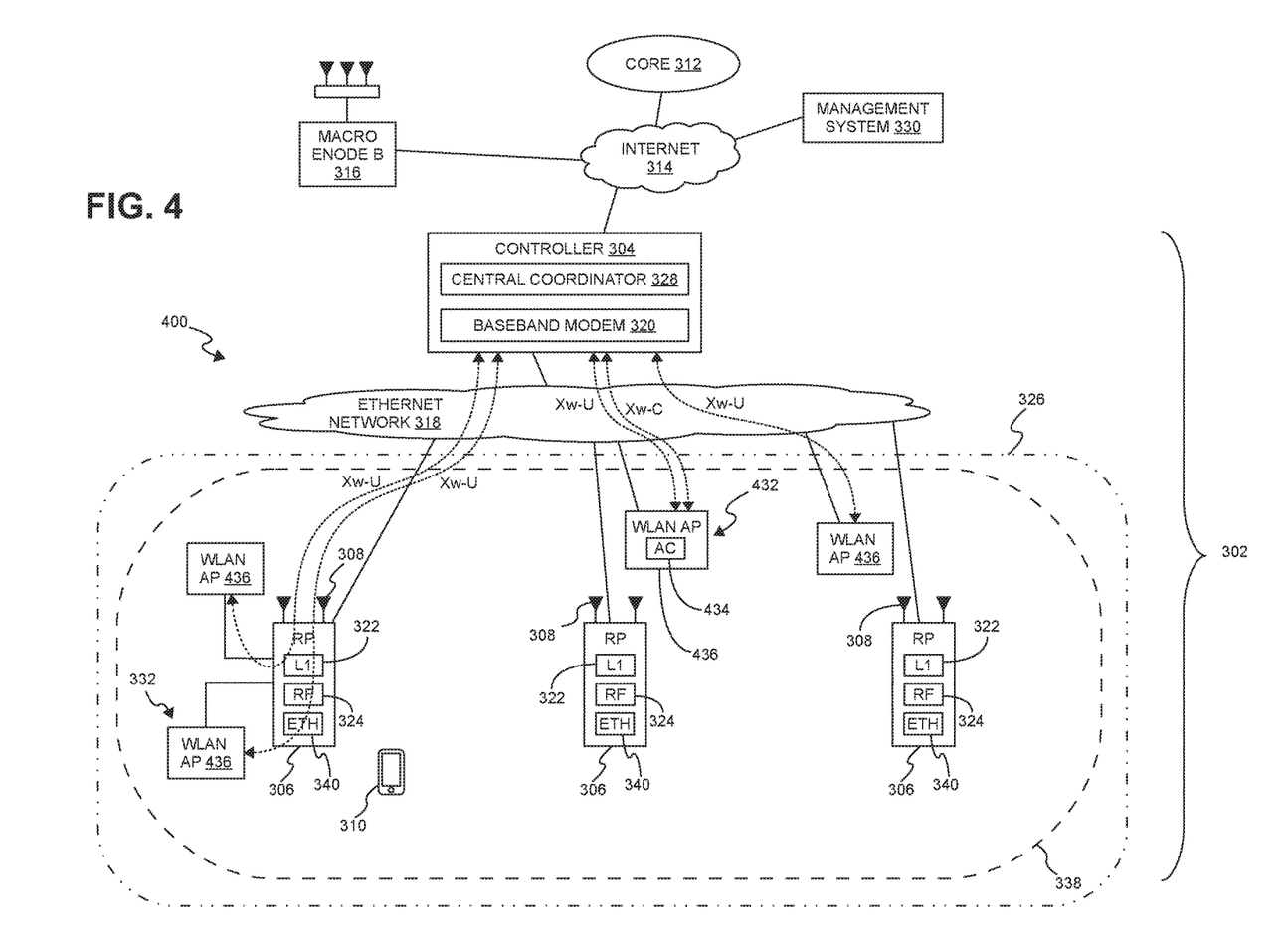
FIG. 4 is a block diagram of another example of a radio access node with support for WLAN link aggregation.

In this example, the wireless termination 332 is implemented using a WLAN access controller (AC) 334 that is collocated with the controller 304 and a plurality of remotely located WLAN access points (APs) 336. The WLAN AC 334 implements the WLAN-related control functions for the WLAN APs 336. It is to be understood, however, that in other embodiments the WT can be implemented in other ways (for example, as shown in FIG. 4 or where the WT is implemented using a WLAN access point).

The LWA control plane traffic (Xw-C) is terminated at the WLAN AC 334, whereas the LWA user plane traffic (Xw-U) received at the WLAN AC 334 is forwarded to the appropriate WLAN APs 336.

Each UE 310 communicates with the controller 304 via the LTE air interface. Each UE 310 provides WLAN measurements to the controller 304 via the LTE air interface. An Xw interface is implemented between the controller 304 and the WLAN AC 334. All WLAN APs 336 that are served by that WLAN AC 334 belong to the same mobility set. This mobility set comprises the set of identifiers (for example, SSID, BSSID, etc.) of the WLAN APs 336 served by the WLAN AC 334. A mobility set corresponds to an Xw interface, which in this case corresponds to the WLAN AC 334. The controller 304 configures the UE 310 with the WLAN mobility set. It is up to the UE 310 to select the best WLAN AP 336 in the mobility set, where this selection is transparent to the controller 304. If there are multiple WLAN ACs 334 and therefore multiple Xw interfaces (each representing a different mobility set), mobility between these is managed by the controller 304.

In the example shown in FIG. 3, the controller 304 sends LWA user plane data Xw-U to the WLAN AC 334, which in turn forwards the LWA user plane data Xw-U to the appropriate WLAN AP 336.

In this example, only a single LWA Xw interface (both user and control planes) needs to be established by the controller 304 with the WLAN AC 334. Also, the routing of LWA Xw interface traffic between the controller 304 and the WLAN AC 334 can be optimized by collocating the WLAN AC 334 with the controller 304.

Moreover, the implementation of LWA support in the controller 304 is relatively straightforward since only a single LWA mobility group 338 is used, thereby avoiding the need for complex tracking by the controller 304 of UE 310 across many different LWA mobility groups. Furthermore, while a UE 310 is within the coverage area of the RAN 300, the LWA anchor point for that UE 310 (that is, the controller 304) will not change as the UE 310 moves within the site 302, thereby avoiding the need for complex tracking by the WLAN AC 334 of which Xw interface each UE 310 is associated with, which is typically the case in small-cell-LWA deployments.

Also, because there is a single super cell 326 and a single LWA mobility group 338, it is possible to reduce gaps in LWA coverage resulting from differing hand-over boundaries between the unlicensed-spectrum coverage areas of the WiFi APs and the licensed-spectrum coverage areas of the small cells in small-cell-LWA deployments.

FIG. 4 is a block diagram of another example of a centralized radio access node (C-RAN) 400 with support for WLAN link aggregation.

In general, except as explained below, the C-RAN 400 is as described above in connection FIG. 3, the description of which is not repeated here in connection with FIG. 4.

In the example shown in FIG. 4, the WLAN AC 434 is not collocated with the controller 304. Instead, the WLAN AC 434 entity can be virtualized and executed as needed on any of the equipment used to implement the WLAN APs 436.

In the C-RAN 400 shown in FIG. 4, the LWA unlicensed control traffic Xw-C is terminated at the WLAN AC 434 as is the case in the embodiment described above in connection FIG. 3.

However, in this example, the controller 304 does not communicate LWA user plane traffic Xw-U through the WLAN AC 434. Instead, the controller 304 communicates LWA user plane traffic Xw-U to the appropriate WLAN AP 436 without first being communicated to the WLAN AC 434.

In this example, at least some of the WLAN APs 436 are communicatively coupled to the ETHERNET network 318 via the ETHERNET pass-through interface 340 of a respective RP 306. In this way, a single connection to the ETHERNET network 318 can be shared by the RP 306 and the WLAN AP 436. For those WiFi APs 436 coupled to the ETHERNET network 318 via a connection to an RP 306, the controller 304 communicates LWA user plane traffic Xw-U to those WiFi APs 436 via the connection provided by the respective RP 306.

The example shown in FIG. 4 is suitable for use in situations where the WiFi AC 434 functionality is virtualized and can be deployed in one of the WiFi APs 436. In such a situation, only the LWA control plane traffic Xw-C is communicated between the controller 304 and the WiFi AC 434. This avoids any issues with the hairpinning of LWA user plan traffic Xw-U.

Also, although the wireless termination (WT) is shown in FIGS. 3 and 4 as being implemented using an WLAN AC, it is to be understood that the WT can be implemented in other ways (for example, where the WT is implemented as a single WLAN AP).

Moreover, the techniques described here can also be used to aggregate a licensed LTE link and an unlicensed WLAN link to wirelessly transmit upstream user data from a UE.

Figure 5:
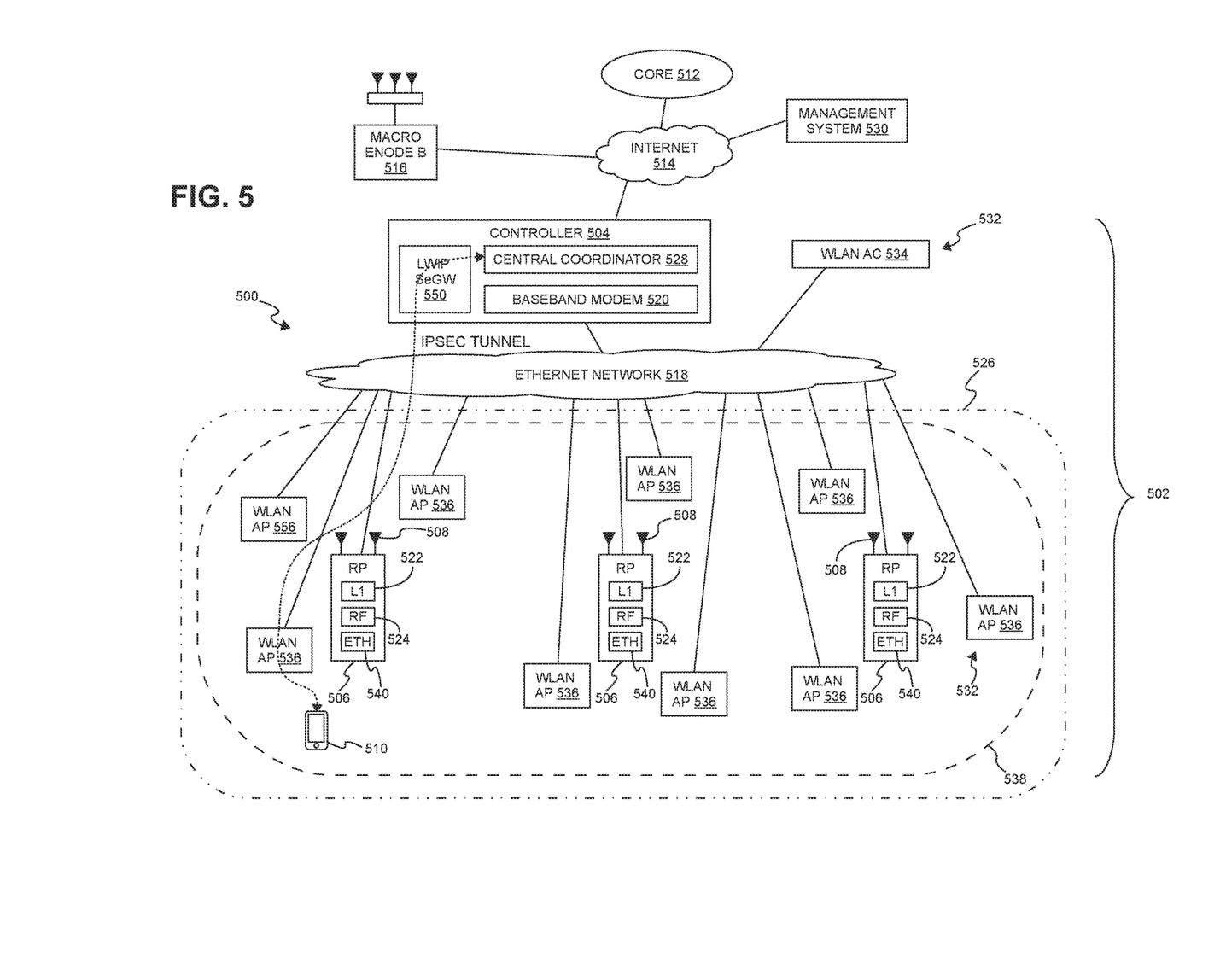
FIG. 5 is a block diagram illustrating one exemplary embodiment of a radio access node with support for using unlicensed RF spectrum to deliver LTE wireless service using LWIP.

Furthermore, similar techniques can be used with LTE WLAN Radio Level Integration with IPSec Tunnel (LWIP), which is another approach to using unlicensed RF spectrum to deliver LTE wireless service. FIG. 5 is a block diagram of an example of a centralized radio access node (C-RAN) 500 with support for using unlicensed RF spectrum to deliver LTE wireless service using LWIP.

The elements of the embodiment shown in FIG. 5 that are similar to corresponding elements of the embodiment shown in FIG. 3 are referenced in FIG. 5 using the same reference numerals used in FIG. 3 but with the leading numeral changed from a "3" to a "5". Except as described below, the description of the elements set forth above in connection with the embodiment shown in FIG. 3 applies to the corresponding elements of the embodiment shown in FIG. 5 but generally will not be repeated in connection with FIG. 5 for the sake of brevity.

The C-RAN 500 and user equipment 510 are configured to use both unlicensed and licensed RF spectrum to communicate with each other using LWIP.

The RAN 500 shown in FIG. 5 is configured to use both unlicensed and licensed RF spectrum to communicate with user equipment 510. In the exemplary embodiment shown in FIG. 5, the RAN 500 is configured to use LWIP. One advantage of using LWIP is that doing so is transparent to the WLAN infrastructure 532. That is, the WLAN infrastructure 532 does not need to be modified or extended in order to support LWIP.

Each controller 504 is configured to communicate with each UE 510 using an Internet Protocol Security (IPSec) tunnel established via a security gateway (LWIP-SeGW) 550 by the UE 510. In this example, the LWIP-SeGW 550 is implemented by the controller 504; however, the LWIP-SeGW 500 can be implemented in other ways (for example, the LWIP-SeGW 500 can be implemented on a node other than the controller 504).

In accordance with the LWIP protocol, each UE 510 communicates control data with the controller 504 using licensed RF spectrum and the LTE air interface.

When LWIP is activated, the controller 504 (using licensed RF spectrum and the LTE air interface) sends WLAN mobility set information, bearer information, and an IP address for the LWIP-SeGW 550 to the UE 510 over the LTE air interface using license RF spectrum.

After the UE 501 associates itself with the WLAN infrastructure 532 and authenticates with the core network 504, the UE 510 establishes an IPSec tunnel with the controller 504 via the LWIP-SeGW 550 using the WLAN infrastructure 532. Then, the controller 504 and the UE 510 are able to exchange user data via the WLAN infrastructure 532 (and the unlicensed RF spectrum used by the WLAN infrastructure 532).

Figure 6:
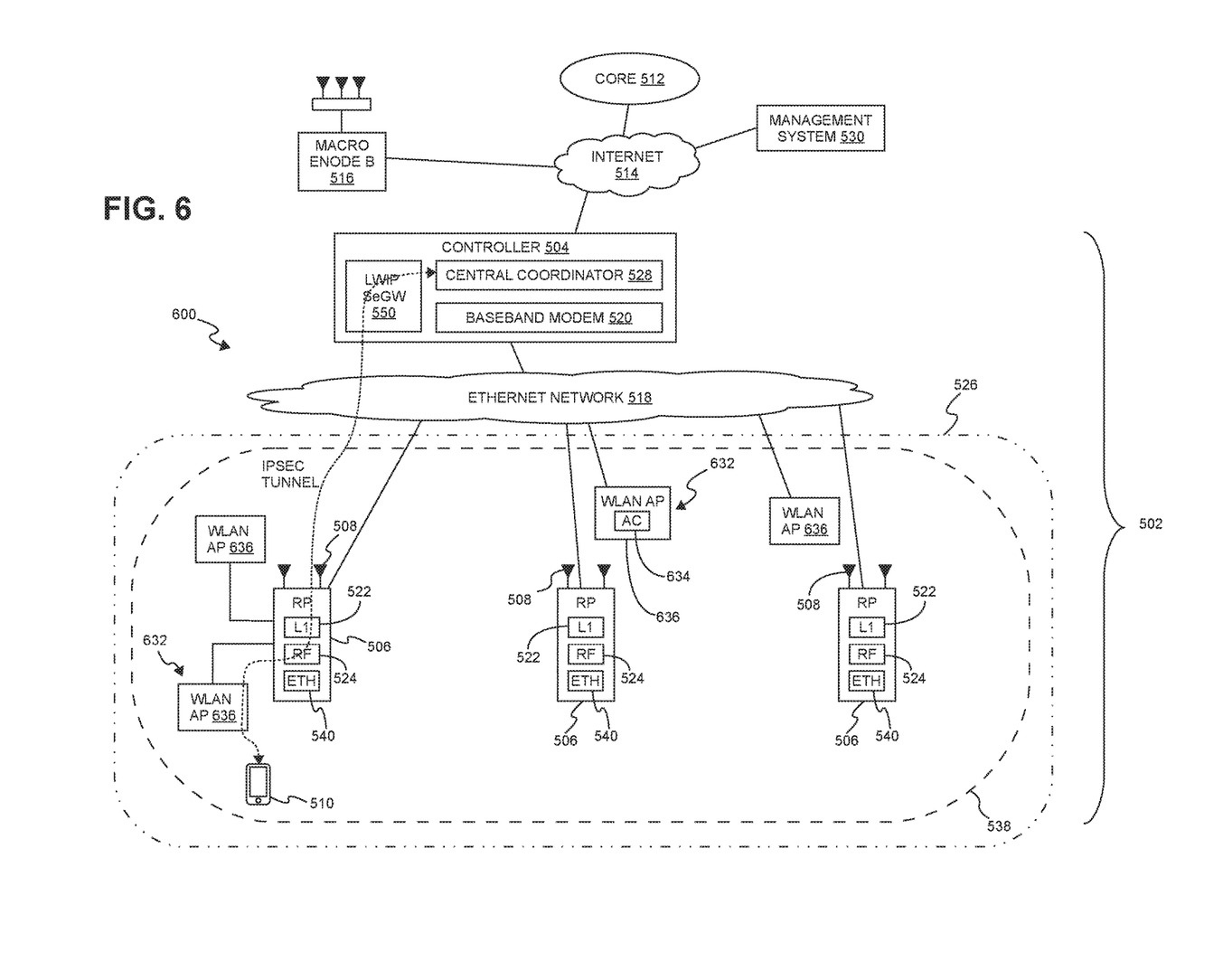
FIG. 6 is a block diagram illustrating another exemplary embodiment of a radio access node with support for using unlicensed RF spectrum to deliver LTE wireless service using LWIP.

In this example, the wireless infrastructure 532 is implemented using a WLAN access controller (AC) 534 that is collocated with the controller 504 and a plurality of remotely located WLAN access points (APs) 536. The WLAN AC 534 implements the WLAN-related control functions for the WLAN APs 536. It is to be understood, however, that in other embodiments the WLAN infrastructure can be implemented in other ways (for example, as shown in FIG. 6 or where the WLAN infrastructure is implemented using a WLAN access point).

As with LWA, in this LWIP embodiment, each UE 510 provides WLAN measurements to the controller 504 via the LTE air interface. All WLAN APs 536 that are served by that WLAN AC 534 belong to the same mobility set. This mobility set comprises the set of identifiers (for example, SSID, BSSID, etc.) of the WLAN APs 536 served by the WLAN AC 534. The controller 504 provides the UE 510 with the WLAN mobility set. It is up to the UE 510 to select the best WLAN AP 536 in the mobility set, where this selection is transparent to the controller 504.

In this example, only a single LWIP-SeGW 550 needs to be provided. Also, the routing of IP traffic between the controller 504 and the WLAN AC 534 can be optimized by collocating the WLAN AC 534 with the controller 504.

Moreover, the implementation of LWIP support in the controller 504 is relatively straightforward since only a single LWIP mobility group 538 is used, thereby avoiding the need for complex tracking by the controller 504 of many different LWIP mobility groups. Furthermore, while a UE 510 is within the coverage area of the RAN 500, the LWIP anchor point for that UE 510 (that is, the controller 504) will not change as the UE 510 moves within the site 502, thereby avoiding the overhead and other issues associated with having the anchor point change as the UE 510 moves within the site 502, which is typically the case in small-cell-LWIP deployments.

Also, because there is a single super cell 526 and a single LWIP mobility group 538, it is possible to reduce gaps in LWIP coverage resulting from differing hand-over boundaries between the unlicensed-spectrum coverage areas of the WiFi APs and the licensed-spectrum coverage areas of the small cells in small-cell-LWIP deployments.

FIG. 6 is a block diagram of another example of a centralized radio access node (C-RAN) 600 with support for WLAN link aggregation using LWIP.

In general, except as explained below, the C-RAN 600 is as described above in connection FIG. 5, the description of which is not repeated here in connection with FIG. 6.

In the example shown in FIG. 6, the WLAN AC 634 is not collocated with the controller 504. Instead, the WLAN AC 634 entity can be virtualized and executed as needed on any of the equipment used to implement the WLAN APs 636.

In this example, at least some of the WLAN APs 636 are communicatively coupled to the ETHERNET network 518 via the ETHERNET pass-through interface 540 of a respective RP 506. In this way, a single connection to the ETHERNET network 518 can be shared by the RP 506 and the WLAN AP 636. For those WLAN APs 636 coupled to the ETHERNET network 518 via a connection to an RP 506, the controller 504 is able to communicate with those WLAN APs 636 via the connection provided by the respective RP 506.

The example shown in FIG. 6 is suitable for use in situations where the WLAN AC 634 functionality is virtualized and can be deployed in one of the WLAN APs 636.

Also, although the WLAN infrastructure is shown in FIGS. 5 and 6 as being implemented using an WLAN AC, it is to be understood that the WLAN infrastructure can be implemented in other ways (for example, where the WLAN infrastructure is implemented as a single WLAN AP).

Moreover, the LWIP techniques described here can also be used to aggregate a licensed LTE link and an unlicensed WLAN link to wirelessly transmit control data (as well as user data) with a UE.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service to user equipment using licensed radio frequency (RF) spectrum and unlicensed RF spectrum, the system comprising: a controller communicatively coupled to a core network of a wireless service provider; a plurality of radio points to transmit and receive radio frequency signals to and from the user equipment using the licensed RF spectrum, each of the radio points associated with at least one antenna and located remote from the controller, wherein the plurality of radio points is communicatively coupled to the controller over a switched Ethernet network; and a wireless termination to transmit and receive radio frequency signals to and from the user equipment using unlicensed RF spectrum, wherein the wireless termination comprises a plurality of wireless local area network (WLAN) access points; wherein the controller is configured to use a mobility group for providing the wireless service to the user equipment using the unlicensed RF spectrum and the plurality of WLAN access points; and wherein the controller is configured to establish an interface with the wireless termination for the mobility group to communicate control plane data to the wireless termination associated with providing the wireless service to the user equipment using the unlicensed RF spectrum.

Example 2 includes the system of Example 1, wherein the system is configured to communicate, to the user equipment using the licensed RF spectrum, the control plane data associated with providing the wireless service to the user equipment using the unlicensed RF spectrum in order to anchor the user equipment.

Example 3 includes the system of any of the Examples 1-2, wherein the controller comprises a plurality of baseband units, each baseband unit providing capacity for a single cellular sector and used with a single cell sharing a common physical cell identifier and for which common control and reference signals are transmitted; wherein the controller further comprises a central coordinator to perform central scheduling for all of the baseband units across all of the radio points and the wireless termination; and wherein the controller is configured to associate the mobility group with the single cell.

Example 4 includes the system of any of the Examples 1-3, wherein the wireless termination comprises a WLAN access controller for the plurality of WLAN access points.

Example 5 includes the system of Example 4, wherein the WLAN access controller is collocated with the controller.

Example 6 includes the system of any of the Examples 4-5, wherein the WLAN access controller is implemented at one of the WLAN access points.

Example 7 includes the system of any of the Examples 4-6, wherein the controller is configured to establish said interface with the WLAN access controller.

Example 8 includes the system of any of the Examples 4, wherein the controller is configured to communicate the control plane data over the interface with the WLAN access controller.

Example 9 includes the system of any of the Examples 4-8, wherein the controller is configured to communicate user plane data over the interface with the WLAN access controller, wherein the user plane data is forwarded from the WLAN access controller to the WLAN access points.

Example 10 includes the system of any of the Examples 4-9, wherein the controller is configured to establish an interface with one or more of the WLAN access points, without going through the WLAN access controller, for the mobility group associated with providing the wireless service to the user equipment using the unlicensed RF spectrum.

Example 11 includes the system of Example 10, wherein at least one WLAN access point is connected to a radio point in order to couple said at least one WLAN access point to an ETHERNET network; and wherein the controller is configured to establish an interface with said at least one WLAN access point via said radio point to which said at least one WLAN access point is connected.

Example 12 includes the system of any of the Examples 1-11, wherein each of the radio points is configured to perform at least some Layer-1 processing for providing the wireless service to the user equipment using the licensed RF spectrum, wherein in-phase and quadrature (IQ) data representing frequency-domain symbols providing the wireless service to the user equipment using the licensed RF spectrum are front-hauled between the controller and the radio points.

Example 13 includes the system of Example 12, wherein the IQ data representing frequency-domain symbols for providing the wireless service to the user equipment using the licensed RF spectrum are front-hauled between the controller and the radio points in a compressed form.

Example 14 includes a system to provide wireless service to user equipment using licensed radio frequency (RF) spectrum and unlicensed RF spectrum, the system comprising: a controller communicatively coupled to an LTE core network of a wireless service provider that provides the wireless service; a plurality of radio points to transmit and receive radio frequency signals to and from the user equipment using an LTE air interface and licensed RF spectrum, each of the radio points associated with at least one antenna and located remote from the controller, wherein the plurality of radio points is communicatively coupled to the controller over a switched ETHERNET network; a wireless local area network (WLAN) access controller; and a plurality of WLAN access points to transmit and receive radio frequency signals to and from the user equipment using unlicensed RF spectrum, wherein the WLAN access points communicatively coupled to the WLAN access controller; wherein the controller is configured to use a LWA mobility group for providing the wireless service to the user equipment using the unlicensed RF spectrum and the plurality of WLAN access points; and wherein the controller is configured to establish an LWA Xw interface with the WLAN access controller for the LWA mobility group to communicate Xw-C control plane data and Xw-U user plane data associated with providing the wireless service to the user equipment using the unlicensed RF spectrum.

Example 15 includes the system of Example 14, wherein the WLAN access controller is collocated with the controller.

Example 16 includes the system of any of the Examples 14-15, wherein the controller is configured to communicate the Xw-U user plane data over the LWA Xw interface with the WLAN access controller, wherein the Xw-U user plane data is forwarded from the WLAN access controller to the WLAN access points.

Example 17 includes a system to provide wireless service to user equipment using licensed radio frequency (RF) spectrum and unlicensed RF spectrum, the system comprising: a controller communicatively coupled to an LTE core network of a wireless service provider that provides the wireless service; a plurality of radio points to transmit and receive radio frequency signals to and from the user equipment using an LTE air interface and licensed RF spectrum, each of the radio points associated with at least one antenna and located remote from the controller, wherein the plurality of radio points is communicatively coupled to the controller over a switched ETHERNET network; a wireless local area network (WLAN) access controller; and a plurality of WLAN access points to transmit and receive radio frequency signals to and from the user equipment using unlicensed RF spectrum, wherein the WLAN access points communicatively coupled to the WLAN access controller; wherein the controller is configured to use a LWA mobility group for providing the wireless service to the user equipment using the unlicensed RF spectrum and the plurality of WLAN access points; wherein the controller is configured to establish an LWA Xw-C interface with the WLAN access controller for the LWA mobility group to communicate Xw-C control plane data associated with providing the wireless service to the user equipment using the unlicensed RF spectrum; and wherein the controller is configured to establish a respective LWA Xw-U interface with each WLAN access point for the LWA mobility group to communicate Xw-U user plane data associated with providing the wireless service to the user equipment using the unlicensed RF spectrum.

Example 18 includes the system of Example 17, wherein at least one WLAN access point is connected to one of the radio points in order to couple said at least one WLAN access point to the ETHERNET network; and wherein the controller is configured to establish the respective LWA Xw-U interface with said at least one WLAN access point via said radio point to which said at least one WLAN access point is connected.

Example 19 includes the system of any of the Examples 17-18, wherein the WLAN access controller is implemented at one of the WLAN access points.

Example 20 includes a system to provide wireless service to user equipment using licensed radio frequency (RF) spectrum and unlicensed RF spectrum, the system comprising: a controller communicatively coupled to a core network of a wireless service provider; a plurality of radio points to transmit and receive radio frequency signals to and from the user equipment using the licensed RF spectrum, each of the radio points associated with at least one antenna and located remote from the controller, wherein the plurality of radio points is communicatively coupled to the controller over a switched Ethernet network; a security gateway; and wireless local area network (WLAN) infrastructure to transmit and receive radio frequency signals to and from the user equipment using unlicensed RF spectrum, wherein the WLAN infrastructure comprises a plurality of WLAN access points; wherein the controller is configured to use a mobility group for providing the wireless service to the user equipment using the unlicensed RF spectrum and the plurality of WLAN access points; and wherein the controller is configured to communicate with the user equipment using Internet Protocol Security (IPSec) tunnels established via the security gateway by the user equipment.

Example 21 includes the system of Example 20, wherein the core network comprises an LTE Evolved Packet Core network; wherein the security gateway comprises a LWIP security gateway (LWIP-SeGW); and wherein the mobility group comprises a LWIP mobility group.

Example 22 includes the system of any of the Examples 20-21, wherein the security gateway is implemented by the controller.

Example 23 includes the system of any of the Examples 20-22, wherein the system is configured to communicate, to the user equipment using the licensed RF spectrum, the control plane data associated with providing the wireless service to the user equipment using the unlicensed RF spectrum in order to anchor the user equipment.

Example 24 includes the system of any of the Examples 20-23, wherein the controller comprises a plurality of baseband units, each baseband unit providing capacity for a single cellular sector and used with a single cell sharing a common physical cell identifier and for which common control and reference signals are transmitted; wherein the controller further comprises a central coordinator to perform central scheduling for all of the baseband units across all of the radio points and the wireless termination; and wherein the controller is configured to associate the mobility group with the single cell.

Example 25 includes the system of any of the Examples 20-24, wherein the WLAN infrastructure comprises a WLAN access controller for the plurality of WLAN access points.

Example 26 includes the system of Example 25, wherein the WLAN access controller is collocated with the controller.

Example 27 includes the system of any of the Examples 25-26, wherein the WLAN access controller is implemented at one of the WLAN access points.

Example 28 includes the system of any of the Examples 20-27, wherein at least one WLAN access point is connected to a radio point in order to couple said at least one WLAN access point to an ETHERNET network.

Example 29 includes the system of any of the Examples 20-28, wherein each of the radio points is configured to perform at least some Layer-1 processing for providing the wireless service to the user equipment using the licensed RF spectrum, wherein in-phase and quadrature (IQ) data representing frequency-domain symbols providing the wireless service to the user equipment using the licensed RF spectrum are front-hauled between the controller and the radio points.

Example 30 includes the system of Example 29, wherein the IQ data representing frequency-domain symbols for providing the wireless service to the user equipment using the licensed RF spectrum are front-hauled between the controller and the radio points in a compressed form.

What is claimed is:

1. A system to provide wireless service to user equipment using licensed radio frequency (RF) spectrum and unlicensed RF spectrum, the system comprising:
    a controller communicatively coupled to a core network of a wireless service provider;
    a plurality of radio points to transmit and receive radio frequency signals to and from the user equipment using the licensed RF spectrum, each of the radio points associated with at least one antenna and located remote from the controller, wherein the plurality of radio points is communicatively coupled to the controller over a switched Ethernet network; and
    a wireless termination to transmit and receive radio frequency signals to and from the user equipment using unlicensed RF spectrum, wherein the wireless termination comprises a plurality of wireless local area network (WLAN) access points;
    wherein the controller is configured to use a mobility group for providing the wireless service to the user equipment using the unlicensed RF spectrum and the plurality of WLAN access points; and
    wherein the controller is configured to establish an interface with the wireless termination for the mobility group to communicate control plane data to the wireless termination associated with providing the wireless service to the user equipment using the unlicensed RF spectrum.

2. The system of claim 1, wherein the system is configured to communicate, to the user equipment using the licensed RF spectrum, the control plane data associated with providing the wireless service to the user equipment using the unlicensed RF spectrum in order to anchor the user equipment.

3. The system of claim 1, wherein the controller comprises a plurality of baseband units, each baseband unit providing capacity for a single cellular sector and used with a single cell sharing a common physical cell identifier and for which common control and reference signals are transmitted;
    wherein the controller further comprises a central coordinator to perform central scheduling for all of the baseband units across all of the radio points and the wireless termination; and
    wherein the controller is configured to associate the mobility group with the single cell.

4. The system of claim 1, wherein the wireless termination comprises a WLAN access controller for the plurality of WLAN access points.

5. The system of claim 4, wherein the WLAN access controller is collocated with the controller.

6. The system of claim 4, wherein the WLAN access controller is implemented at one of the WLAN access points.

7. The system of claim 4, wherein the controller is configured to establish said interface with the WLAN access controller.

8. The system of claim 4, wherein the controller is configured to communicate the control plane data over the interface with the WLAN access controller.

9. The system of claim 4, wherein the controller is configured to communicate user plane data over the interface with the WLAN access controller, wherein the user plane data is forwarded from the WLAN access controller to the WLAN access points.

10. The system of claim 4, wherein the controller is configured to establish an interface with one or more of the WLAN access points, without going through the WLAN access controller, for the mobility group associated with providing the wireless service to the user equipment using the unlicensed RF spectrum.

11. The system of claim 10, wherein at least one WLAN access point is connected to a radio point in order to couple said at least one WLAN access point to an ETHERNET network; and
wherein the controller is configured to establish an interface with said at least one WLAN access point via said radio point to which said at least one WLAN access point is connected.

12. The system of claim 1, wherein each of the radio points is configured to perform at least some Layer-1 processing for providing the wireless service to the user equipment using the licensed RF spectrum, wherein in-phase and quadrature (IQ) data representing frequency-domain symbols providing the wireless service to the user equipment using the licensed RF spectrum are front-hauled between the controller and the radio points.

13. The system of claim 12, wherein the IQ data representing frequency-domain symbols for providing the wireless service to the user equipment using the licensed RF spectrum are front-hauled between the controller and the radio points in a compressed form.

14. A system to provide wireless service to user equipment using licensed radio frequency (RF) spectrum and unlicensed RF spectrum, the system comprising:
a controller communicatively coupled to an LTE core network of a wireless service provider that provides the wireless service;
a plurality of radio points to transmit and receive radio frequency signals to and from the user equipment using an LTE air interface and licensed RF spectrum, each of the radio points associated with at least one antenna and located remote from the controller, wherein the plurality of radio points is communicatively coupled to the controller over a switched ETHERNET network;
a wireless local area network (WLAN) access controller; and
a plurality of WLAN access points to transmit and receive radio frequency signals to and from the user equipment using unlicensed RF spectrum, wherein the WLAN access points communicatively coupled to the WLAN access controller;
wherein the controller is configured to use a LWA mobility group for providing the wireless service to the user equipment using the unlicensed RF spectrum and the plurality of WLAN access points; and
wherein the controller is configured to establish an LWA Xw interface with the WLAN access controller for the LWA mobility group to communicate Xw-C control plane data and Xw-U user plane data associated with providing the wireless service to the user equipment using the unlicensed RF spectrum.

15. The system of claim 14, wherein the WLAN access controller is collocated with the controller.

16. The system of claim 14, wherein the controller is configured to communicate the Xw-U user plane data over the LWA Xw interface with the WLAN access controller, wherein the Xw-U user plane data is forwarded from the WLAN access controller to the WLAN access points.

17. A system to provide wireless service to user equipment using licensed radio frequency (RF) spectrum and unlicensed RF spectrum, the system comprising:
a controller communicatively coupled to an LTE core network of a wireless service provider that provides the wireless service;
a plurality of radio points to transmit and receive radio frequency signals to and from the user equipment using an LTE air interface and licensed RF spectrum, each of the radio points associated with at least one antenna and located remote from the controller, wherein the plurality of radio points is communicatively coupled to the controller over a switched ETHERNET network;
a wireless local area network (WLAN) access controller; and
a plurality of WLAN access points to transmit and receive radio frequency signals to and from the user equipment using unlicensed RF spectrum, wherein the WLAN access points communicatively coupled to the WLAN access controller;
wherein the controller is configured to use a LWA mobility group for providing the wireless service to the user equipment using the unlicensed RF spectrum and the plurality of WLAN access points;
wherein the controller is configured to establish an LWA Xw-C interface with the WLAN access controller for the LWA mobility group to communicate Xw-C control plane data associated with providing the wireless service to the user equipment using the unlicensed RF spectrum; and
wherein the controller is configured to establish a respective LWA Xw-U interface with each WLAN access point for the LWA mobility group to communicate Xw-U user plane data associated with providing the wireless service to the user equipment using the unlicensed RF spectrum.

18. The system of claim 17, wherein at least one WLAN access point is connected to one of the radio points in order to couple said at least one WLAN access point to the ETHERNET network; and
wherein the controller is configured to establish the respective LWA Xw-U interface with said at least one WLAN access point via said radio point to which said at least one WLAN access point is connected.

19. The system of claim 17, wherein the WLAN access controller is implemented at one of the WLAN access points.

20. A system to provide wireless service to user equipment using licensed radio frequency (RF) spectrum and unlicensed RF spectrum, the system comprising:
a controller communicatively coupled to a core network of a wireless service provider;
a plurality of radio points to transmit and receive radio frequency signals to and from the user equipment using the licensed RF spectrum, each of the radio points associated with at least one antenna and located remote from the controller, wherein the plurality of radio points is communicatively coupled to the controller over a switched Ethernet network;
a security gateway; and
wireless local area network (WLAN) infrastructure to transmit and receive radio frequency signals to and from the user equipment using unlicensed RF spectrum, wherein the WLAN infrastructure comprises a plurality of WLAN access points;
wherein the controller is configured to use a mobility group for providing the wireless service to the user equipment using the unlicensed RF spectrum and the plurality of WLAN access points; and
wherein the controller is configured to communicate with the user equipment using Internet Protocol Security (IPSec) tunnels established via the security gateway by the user equipment.

21. The system of claim 20, wherein the core network comprises an LTE Evolved Packet Core network;

wherein the security gateway comprises a LWIP security gateway (LWIP-SeGW); and wherein the mobility group comprises a LWIP mobility group.

22. The system of claim 20, wherein the security gateway is implemented by the controller.

23. The system of claim 20, wherein the system is configured to communicate, to the user equipment using the licensed RF spectrum, the control plane data associated with providing the wireless service to the user equipment using the unlicensed RF spectrum in order to anchor the user equipment.

24. The system of claim 20, wherein the controller comprises a plurality of baseband units, each baseband unit providing capacity for a single cellular sector and used with a single cell sharing a common physical cell identifier and for which common control and reference signals are transmitted;

wherein the controller further comprises a central coordinator to perform central scheduling for all of the baseband units across all of the radio points and the wireless termination; and wherein the controller is configured to associate the mobility group with the single cell.

25. The system of claim 20, wherein the WLAN infrastructure comprises a WLAN access controller for the plurality of WLAN access points.

26. The system of claim 25, wherein the WLAN access controller is collocated with the controller.

27. The system of claim 25, wherein the WLAN access controller is implemented at one of the WLAN access points.

28. The system of claim 20, wherein at least one WLAN access point is connected to a radio point in order to couple said at least one WLAN access point to an ETHERNET network.

29. The system of claim 20, wherein each of the radio points is configured to perform at least some Layer-1 processing for providing the wireless service to the user equipment using the licensed RF spectrum, wherein in-phase and quadrature (IQ) data representing frequency-domain symbols providing the wireless service to the user equipment using the licensed RF spectrum are front-hauled between the controller and the radio points.

30. The system of claim 29, wherein the IQ data representing frequency-domain symbols for providing the wireless service to the user equipment using the licensed RF spectrum are front-hauled between the controller and the radio points in a compressed form.

* * * * *